(12) United States Patent
Jeong et al.

(10) Patent No.: US 11,190,927 B2
(45) Date of Patent: Nov. 30, 2021

(54) VEHICULAR NEIGHBOR DISCOVERY FOR IP-BASED VEHICULAR NETWORKS

(71) Applicant: Research & Business Foundation Sungkyunkwan University, Suwon-si (KR)

(72) Inventors: Jaehoon Jeong, Busan (KR); Yiwen Shen, Suwon-si (KR); Zhong Xiang, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 24 days.

(21) Appl. No.: 16/922,008

(22) Filed: Jul. 7, 2020

(65) Prior Publication Data

US 2021/0014661 A1    Jan. 14, 2021

(30) Foreign Application Priority Data

Jul. 8, 2019   (KR) .................. 10-2019-0082145
Nov. 4, 2019   (KR) .................. 10-2019-0139808

(51) Int. Cl.
| | |
|---|---|
| *H04W 8/00* | (2009.01) |
| *H04W 4/40* | (2018.01) |
| *H04W 60/04* | (2009.01) |
| *H04W 88/04* | (2009.01) |

(52) U.S. Cl.
CPC ............. *H04W 8/005* (2013.01); *H04W 4/40* (2018.02); *H04W 60/04* (2013.01); *H04W 88/04* (2013.01)

(58) Field of Classification Search
CPC ....... H04W 8/005; H04W 4/40; H04W 60/04; H04W 88/04
USPC ......................................................... 370/329
See application file for complete search history.

(56) References Cited

U.S. PATENT DOCUMENTS

| | | | |
|---|---|---|---|
| 2016/0309524 A1* | 10/2016 | Barreto De Miranda Sargento .... H04W 76/10 |
| 2017/0280378 A1* | 9/2017 | Atarius ................... H04L 12/18 |
| 2018/0184270 A1* | 6/2018 | Chun .................... H04W 24/08 |
| 2020/0107168 A1* | 4/2020 | Thubert ................ H04W 12/10 |
| 2020/0168086 A1* | 5/2020 | Rakshit ............ G08G 1/096822 |
| 2020/0228948 A1* | 7/2020 | Watfa ..................... H04L 67/16 |

OTHER PUBLICATIONS

IPv6 Neighbor Discovery for IP-Based Vehicular Networks Jeong et al. Mar. 2019 (Year: 2019).*

* cited by examiner

*Primary Examiner* — William Nealon
(74) *Attorney, Agent, or Firm* — NSIP Law

(57) ABSTRACT

A method for a first vehicle to perform a neighbor discovery in an IP-based vehicular network is disclosed. The method includes, based on the first vehicle failed in a router discovery for a direct registration with an adjacent road-side unit (RSU), sending one or more first neighbor solicitation (NS) messages to a second vehicle; receiving, from the second vehicle, a first neighbor advertisement (NA) message as a response to the first NS message; and sending, to the second vehicle, a second NS message for registering the second vehicle as a relay vehicle based on the first NA message.

10 Claims, 8 Drawing Sheets

| Type | Length | Prefix Length | Distance |
|---|---|---|---|
| Reserved ||||
| Prefix ||||

| Type | Length | Reserved1 |
|---|---|---|
| Protocol | Reserved2 | Port Number |
| Node Address |||

| Type | Length | Reserved1 |
|---|---|---|
| Reserved2 ||| 
| Mobility Information |||

VEHICULAR NEIGHBOR DISCOVERY FOR IP-BASED VEHICULAR NETWORKS

CROSS-REFERENCE TO RELATED APPLICATION

This application claims the priority benefit of Korean Patent Application No. 10-2019-0082145 filed on Jul. 8, 2019, and No. 10-2019-0139808 filed on Nov. 4, 2019, which is incorporated herein by reference for all purposes as if fully set forth herein.

BACKGROUND OF THE INVENTION

Field of the Invention

The present disclosure relates to a vehicular neighbor discovery method, and more particularly to defining a vehicular neighbor discovery (VND) method with extension of IPv6 neighbor discovery (ND) for IP-based vehicular networks.

Discussion of the Related Art

Vehicular Ad Hoc Networks (VANET) have been researched for Intelligent Transportation System (ITS) such as driving safety, efficient driving, and entertainment. Considering the high-speed mobility of vehicular network based on Dedicated Short-Range Communications (DSRC), IEEE has standardized IEEE 802.11-OCB (Outside the Context of a Basic Service Set).

Internet is operated according to transport control protocol (TCP)/internet protocol (IP) published by the Internet Engineering Task Force (IETF), and the TCP/IP can be found in RFC 791 issued by the Request For Comments (RFC) 703 and the IETF.

SUMMARY OF THE INVENTION

The present disclosure provides an optimized neighbor discovery (ND) with better adaptability for vehicular networks than IPv6 neighbor discovery [RFC4861], considering fast vehicle mobility and wireless control traffic overhead.

The present disclosure also provides a method capable of efficiently performing prefix and service discovery.

The technical objects of the present disclosure are not limited to the aforementioned technical objects, and other technical objects, which are not mentioned above, will be apparently appreciated by a person having ordinary skill in the art from the following description.

In one aspect, there is provide a method for a first vehicle to perform a neighbor discovery in an IP-based vehicular network, the method comprising, based on the first vehicle failed in a router discovery for a direct registration with an adjacent road-side unit (RSU), sending one or more first neighbor solicitation (NS) messages to a second vehicle; receiving, from the second vehicle, a first neighbor advertisement (NA) message as a response to the first NS message; and sending, to the second vehicle, a second NS message for registering the second vehicle as a relay vehicle based on the first NA message.

The method may further comprise receiving, from the RSU, a second NA message as a response to the second NS message through the second vehicle.

The second NA message may be generated based on a first table for managing a duplicate address included in a mobility anchor (MA) managing a mobility of the IP-based vehicular network.

The method may further comprise waiting for a predetermined time to receive the first NA message; and selecting the second vehicle based on the first NA message, wherein the one or more first NS messages may be multicasted to surrounding vehicles.

Based on the relay vehicle including multiple relay vehicles, the first vehicle and the relay vehicle may have a second table for information on a relay path up to the RSU.

In another aspect, there is provide a first vehicle performing a neighbor discovery in an IP-based vehicular network, the first vehicle comprising a transceiver configured to transmit and receive a signal; a memory configured to store data; and a processor configured to control the transceiver and the memory, wherein the processor is configured to, based on the first vehicle failed in a router discovery for a direct registration with an adjacent road-side unit (RSU) through the transceiver, send one or more first neighbor solicitation (NS) messages to a second vehicle; receive, from the second vehicle, a first neighbor advertisement (NA) message as a response to the first NS message; and send, to the second vehicle, a second NS message for registering the second vehicle as a relay vehicle based on the first NA message.

The present disclosure can implement an optimized neighbor discovery (ND) with better adaptability for vehicular networks than IPv6 neighbor discovery [RFC4861], considering fast vehicle mobility and wireless control traffic overhead.

The present disclosure can efficiently perform prefix and service discovery.

Effects and advantages which can be obtained in the present disclosure are not limited to the aforementioned effects and other unmentioned advantages will be clearly understood by those skilled in the art from the following description.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION OF THE EMBODIMENTS

Hereinafter, preferred embodiments of the present disclosure will be described in detail with reference to the accompanying drawings. The detailed description that will be provided with the accompanying drawings is provided to explain exemplary embodiments of the present disclosure and is not intended to unique embodiments that can implement the present disclosure. The following detailed description includes details to help complete understand the present disclosure. However, those skilled in the art know that the present disclosure can be implemented even without the details.

In some cases, well-known structures and devices may be omitted or the important capability of each structure and device may be shown in a block diagram type to avoid making the concept of the present disclosure unclear.

Specific terms that are used in the following description are provided to help understand the present disclosure, and use of these specific terms may be changed in other ways without departing from the technical spirit of the present disclosure.

To support an interaction between vehicles or between vehicle and rode-side unit (RSU), the present disclosure proposes a vehicular neighbor discovery (VND) as an enhanced IPv6 neighbor discovery (ND) for IP-based vehicular networks [ID-IPWAVE-VND]. For an efficient IPv6 Stateless Address Autoconfiguration (SLAAC) [RFC4862], the VND can adopt an optimized Address Registration using a Multihop Duplicate Address Detection (DAD). This multihop DAD enables a vehicle to have a unique IP address in a multi-link subnet that consists of multiple wireless subnets with the same IP prefix, which corresponds to wireless coverage of a plurality of RSUs. Further, the VND can support IP packet routing via a connected Vehicular Ad Hoc Network (VANET) by letting vehicles exchange the prefixes of their internal networks through their external wireless interface.

The VND provides vehicles with an optimized address registration and a Multihop DAD mechanism. In addition, an efficient mobility management scheme is specified to support efficient V2V, V2I, and V2X communications. Detailed description of the mobility management is addressed in [ID-IPWAVE-VMM].

The present disclosure uses the terminology described in [RFC4861], [RFC4862], and [RFC6775]. In addition, the following new terms are defined as below:

WAVE: Acronym for "Wireless Access in Vehicular Environments" [WAVE-1609.0].

Road-Side Unit (RSU): A node that has physical communication devices (e.g., DSRC, Visible Light Communication, 802.15.4, LTE-V2X, etc.) for wireless communications with vehicles and is also connected to the Internet as a router or switch for packet forwarding. An RSU is typically deployed on the road infrastructure, either at an intersection or in a road segment, but may also be located in car parking areas.

On-Board Unit (OBU): A node that has a DSRC device for wireless communications with other OBUs and RSUs, and may be connected to in-vehicle devices or networks. An OBU is mounted on a vehicle. It is assumed that a radio navigation receiver (e.g., Global Positioning System (GPS)) is included in a vehicle with an OBU for efficient navigation.

Mobility Anchor (MA): A node that maintains IP addresses and mobility information of vehicles in a road network to support the address autoconfiguration and mobility management of them. It has end-to-end (E2E) connections with RSUs under its control. It maintains a DAD Table recording the IP addresses of vehicles moving within the communication coverage of its RSUs.

Vehicular Cloud: A cloud infrastructure for vehicular networks, including compute nodes, storage nodes, and network nodes.

Traffic Control Center (TCC): A node that maintains road infrastructure information (e.g., RSUs, traffic signals, and loop detectors), vehicular traffic statistics (e.g., average vehicle speed and vehicle inter-arrival time per road segment), and vehicle information (e.g., a vehicle's identifier, position, direction, speed, and trajectory as a navigation Path). TCC is included in a vehicular cloud for vehicular networks and has MAs under its management.

1.1 Link Model

There is a relationship between a link and a network Prefix along with reachability scopes, such as link-local and global scopes. The existing IPv6 neighbor discovery (IPv6 legacy ND) protocol [RFC4861] has the following link model. All IPv6 nodes in the same on-link subnet, which use the same subnet Prefix with the on-link bit set, are reachable with each other by one-hop links. The symmetry of the connectivity among the nodes is assumed, that is, bidirectional connectivity between two on-link nodes.

However, a link model in vehicular networks (called vehicular link model) should consider the asymmetry of the connectivity that unidirectional links can exist due to interference in wireless channels and the different levels of transmission power employed by wireless network interfaces.

The on-link subnet can be constructed by one link (as a basic service set) or multiple links (as an extended service set) called a multi-link subnet [RFC6775]. In this multi-link subnet, an all-node-multicasted packet is copied and related to other links by an ND proxy. On the other hand, in vehicular networks having fast moving vehicles, multiple links can share the same subnet Prefix for operation efficiency. For example, if two wireless links under two adjacent RSUs are in the same subnet, a vehicle as an IPv6 host does not need to reconfigure its IPv6 address during handover between those RSUs. However, the packet relay by an RSU as an ND proxy should be performed not to cause a broadcast storm in the extended subnet. Therefore, in the multi-link subnet, all-node-multicasting needs to be well-calibrated to either being confined to multicasting in the current link or being disseminated to other links in the same subnet.

In a connected multihop VANET, for efficient communication, vehicles in the same radio link as an RSU can communicate directly with each other, not through the RSU serving as a router. This direct wireless communication is similar to the direct wired communication in an on-link subnet using Ethernet as a wired network. The vehicular link model needs to accommodate both the ad-hoc based V2V communication between vehicles and V2I communication between a vehicle and an RSU in an efficient and flexible way. Therefore, the IPv6 ND should be extended to accommodate the concept of a new IPv6 link model in vehicular networks.

To support multi-link subnet, the present disclosure employs the shared-prefix model for Prefix assignments. A shared-prefix model refers to an addressing model where the prefix(es) are shared by more than one node. In present disclosure, we assume that in a specified subnet, all interfaces of RSUs responding for prefix assignments to vehicles hold the same Prefix, which ensure vehicles obtain and maintain the same Prefix in this subnet scope.

1.2 ND Optimization

The present disclosure takes advantage of the optimized ND for Low-Power Wireless Personal Area Networks (6LoWPAN) [RFC6775] because vehicular environments have common parts with 6LoWPAN, such as the reduction of unnecessary wireless traffic by multicasting and the energy saving in battery. Note that vehicles tend to be electric vehicles whose energy source is from their battery.

In the optimized IPv6 ND for 6LoWPAN, the connections among nodes are assumed to be asymmetric and unidirectional because of changing radio environment and loss signal. The authors proposed an optimized IPv6 ND which greatly eliminates link-scope multicast to save energy by using new options and a new scheme for address configurations.

Similarly, the present disclosure proposes an improved IPv6 ND by eliminating many link-scope-multicast-based ND operations, such as DAD for IPv6 Stateless Address Autoconfiguration (SLAAC) [RFC4862]. Thus, the present disclosure suggests an extension of IPv6 ND as vehicular ND tailored for vehicular networks along with new ND options (e.g., Prefix discovery, service discovery, and mobility information options).

1.3 Design Goals

The vehicular ND in the present disclosure has the following design goals:

- To perform Prefix and service discovery through ND procedure;
- To implement host-initiated refresh of Router Advertisement (RA) and remove the necessity for routers to use periodic or unsolicited multicast RA to find hosts;
- To replace Neighbor Unreachable Detection (NUD), create Neighbor Cache Entries (NCE) for all registered vehicles in RSUs and MA by appending Address Registration Option (ARO) in Neighbor Solicitation (NS), Neighbor Advertisement (NA) messages;
- To support a multihop DAD by conveying ND messages received from vehicles to MA to eliminate multicast storms and save energy; and
- To support multi-hop communication for vehicles outside the coverage of RSUs to wirelessly communicate with the RSU, that is multihop away, via a relay neighbor vehicle.

Vehicular Network Architecture

Figure 1:
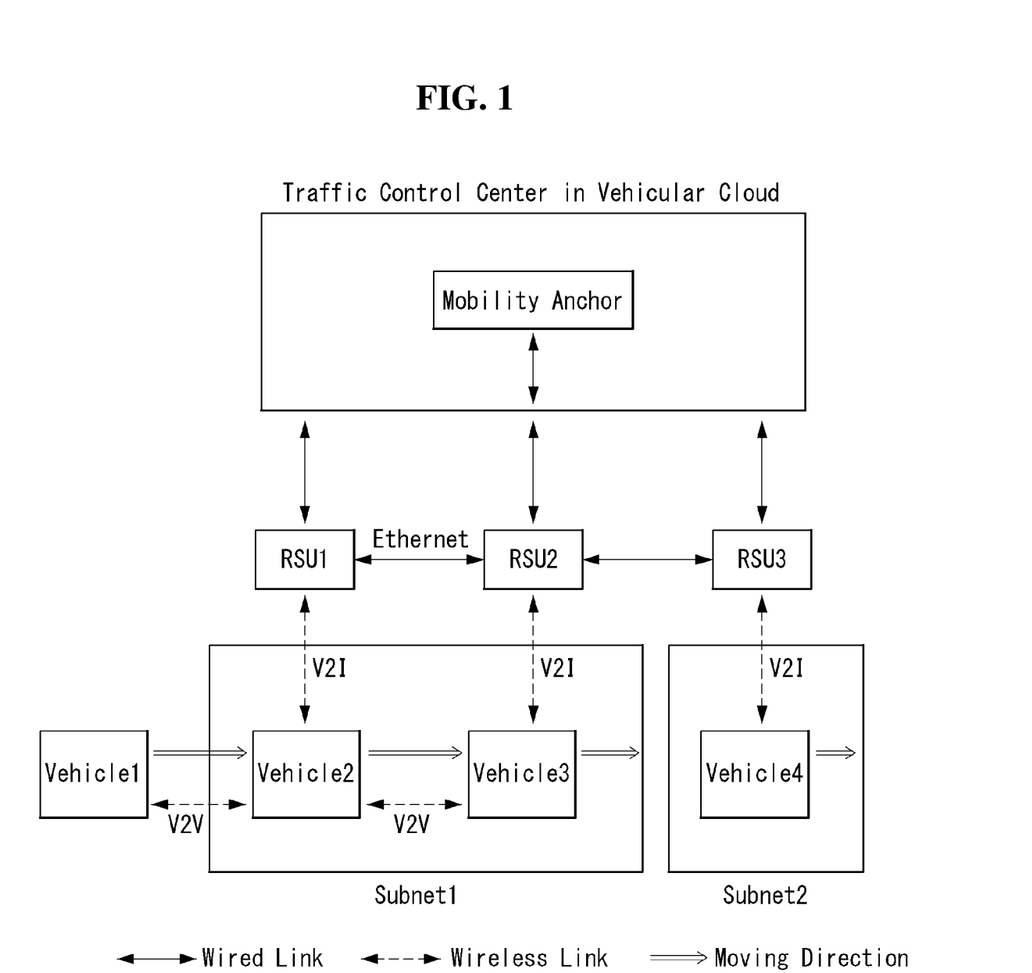
FIG. 1 illustrates a vehicular network architecture for V2I and V2V to which the present disclosure is applicable.

A vehicle network architecture for V2V and V2I communications is described below. Vehicles and RSUs each have an internal network including in-vehicle devices or servers. FIG. 1 illustrates a vehicular network architecture for V2I and V2V to which the present disclosure is applicable.

Referring to FIG. 1, three RSUs are deployed along roadsides and are connected to an MA through wired links. There are two subnets called Subnet1 and Subnet2. The wireless links of RSU1 and RSU2 belong to the same subnet named Subnet1, but the wireless link of RSU3 belongs to another subnet named Subnet2. Vehicle2 is wirelessly connected to RSU1 while Vehicle3 and Vehicle4 are connected to RSU2 and RSU3, respectively. Vehicles can directly communicate with each other through V2V connection (e.g., Vehicle1 and Vehicle2) to share driving information. In addition, vehicles not in the range of any RSU may connect with RSU in multi-hop connection via relay vehicle (e.g., Vehicle1 can contact RSU1 via Vehicle2). Vehicles are assumed to start the connection to an RSU when they entered the coverage of the RSU.

The present disclosure recommends a multi-link subnet involving multiple RSUs as illustrated in FIG. 1. This recommendation aims at the reduction of the frequency with which vehicles have to change their IP address during handover between two adjacent RSUs. To construct this multi-link subnet, a Shared-Prefix model is proposed. That is, for RSUs in the same subnet, the interfaces responsible for Prefix assignment for vehicles should hold the same Prefix in their global address. This also promises vehicles achieve the same Prefix in this scope. When they pass through RSUs in the same subnet, vehicles do not need to perform the Address Registration and DAD again because they can use their current IP address in the wireless coverage of the next RSU.

Moreover, this proposal accords with the assumption that nodes belonging to the same IP Prefix domain are able to communicate with each other directly without the intervention of RSUs if they are within the wireless communication range of each other. On the other hand, if vehicles enter the wireless coverage of an RSU belonging to another subnet with a different Prefix, they repeat the Address Registration and DAD procedure to update their IP address with the new Prefix.

Referring again to FIG. 1, RSU1 and RSU2 are deployed in a multi-link subnet with the same Prefix address in their wireless interfaces responding for connection with vehicles. When vehicle2 leaves the coverage of RSU1 and enters RSU2, it maintains its IP address configuration and ignores Address Registration and DAD steps. If vehicle2 moves into the coverage of RSU3, since RSU3 belongs to another subnet and holds a different Prefix from RSU1 and RSU2, so vehicle2 must do again IP Address Registration and DAD just as connecting to a new RSU. Note that vehicles and RSUs have their internal networks including in-vehicle devices and servers, respectively. The structures of the internal networks are described in [ID-IPWAVE-PS].

ND Extension for Prefix and Service Discovery

This section specifies an IPv6 ND extension for vehicle-to-vehicle (V2V) or vehicle-to-infrastructure (V2I) networking. This section also defines three new ND options for Prefix discovery, service discovery, and mobility information report: (i) Vehicular Prefix Information (VPI) option, (ii) Vehicular Service Information (VSI) option, and (iii) Vehicular Mobility Information (VMI) option. It also describes the procedure of the ND protocol with those options.

1. Vehicular Prefix Information Option

Figure 2:
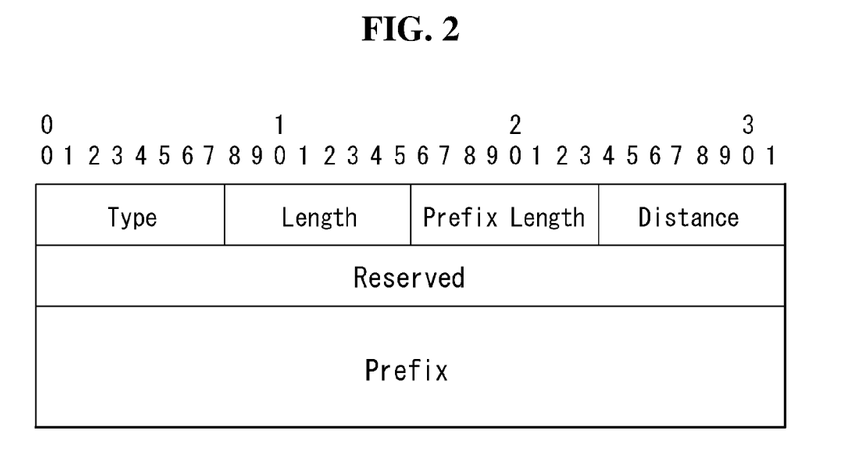
FIG. 2 illustrates a format of VPI option to which the present disclosure is applicable.

The VPI option contains IPv6 Prefix information in the internal network. FIG. 2 illustrates the format of the VPI option.

Table 1 shows an example of the data fields included in the VPI option in this section.

TABLE 1

| | |
|---|---|
| Type | 8-bit identifier of the VPI option type as assigned by the IANA: TBD |
| Length | 8-bit unsigned integer. The length of the option (including the Type and Length fields) is in units of 8 octets. The value is 3. |
| Prefix Length | 8-bit unsigned integer. The number of leading bits in the Prefix that are valid. The value ranges from 0 to 128. |
| Distance | 8-bit unsigned integer. The distance between the subnet announcing this Prefix and the subnet corresponding to this Prefix in terms of the number of hops. |
| Reserved | This field is unused. It MUST be initialized to zero by the sender and MUST be ignored by the receiver. |
| Prefix | An IP address or a Prefix of an IP address. The Prefix Length field contains the number of valid leading bits in the Prefix. The bits in the Prefix after the Prefix length are reserved and MUST be initialized to zero by the sender and ignored by the receiver. |

2. Vehicular Service Information Option

Figure 3:
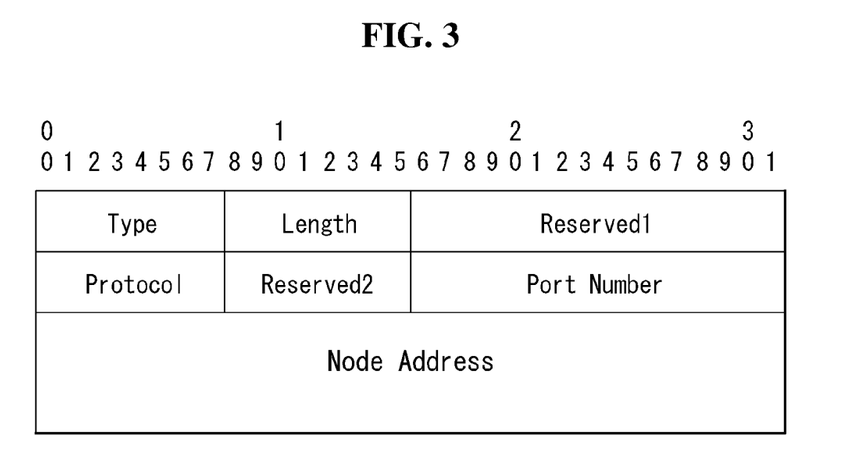
FIG. 3 illustrates a format of VSI option to which the present disclosure is applicable.

The VSI option contains vehicular service information in the internal network. FIG. 3 illustrates the format of the VSI option.

Table 2 shows an example of the data fields included in the VPI option in this section.

TABLE 2

| | |
|---|---|
| Type | 8-bit identifier of the VPI option type as assigned by the IANA: TBD |
| Length | 8-bit unsigned integer. The length of the option (including the Type and Length fields) is in units of 8 octets. The value is 3. |
| Reserved1 | This field is unused. It MUST be initialized to zero by the sender and MUST be ignored by the receiver. |
| Protocol | 8-bit unsigned integer to indicate the upper-layer protocol, such as transport-layer protocol (e.g., TCP, UDP, and SCTP). |
| Reserved2 | This field is unused. It MUST be initialized to zero by the sender and MUST be ignored by the receiver. |
| Port Number | 16-bit unsigned integer to indicate the port number for this protocol. |
| Service Address | 128-bit IPv6 address of a node providing this vehicular service. |

3. Vehicular Mobility Information Option

Figure 4:
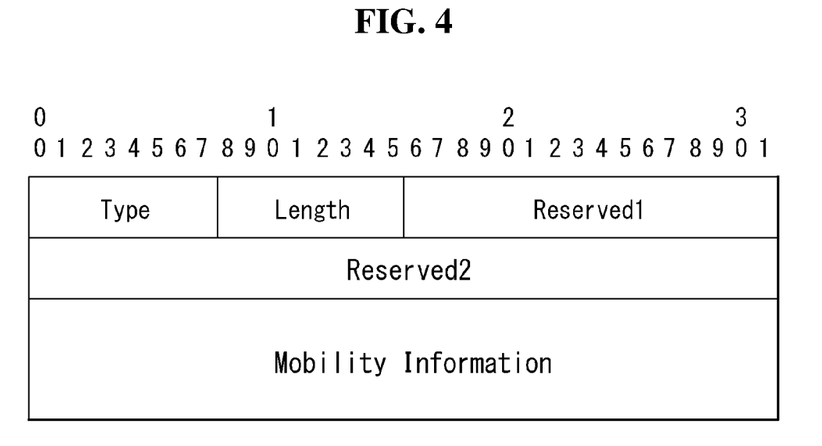
FIG. 4 illustrates a format of VMI option to which the present disclosure is applicable.

The VMI option contains one vehicular mobility information of a vehicle or an RSU. FIG. 4 illustrates the format of the VMI option.

Table 3 shows an example of the data fields included in the VPI option in this section.

TABLE 3

| | |
|---|---|
| Type | 8-bit identifier of the VPI option type as assigned by the IANA: TBD |
| Length | 8-bit unsigned integer. The length of the option (including the Type and Length fields) is in units of 8 octets. The value is 3. |
| Reserved1 | This field is unused. It MUST be initialized to zero by the sender and MUST be ignored by the receiver. |
| Reserved2 | This field is unused. It MUST be initialized to zero by the sender and MUST be ignored by the receiver. |
| Mobility Information | 128-bit mobility information, such as position, speed, acceleration/deceleration, and direction. |

4. Vehicular Neighbor Discovery

Prefix discovery enables hosts (e.g., vehicles and in-vehicle devices) to distinguish destinations on the same link from those only reachable via RSUs. A vehicle (or its in-vehicle devices) can directly communicate with on-link vehicles (or their in-vehicle devices) without the relay of an RSU, but through V2V communications along with VPI ND option. This VPI option contains IPv6 Prefixes in a vehicle's internal network.

Vehicles announce services in their internal networks to other vehicles through an VSI ND option. The VSI option contains a list of vehicular services in a vehicle's or an RSU's internal network.

A vehicle periodically announces an NS message containing VPI and VSI options with its Prefixes and services in all-node-multicast-address to reach all neighboring nodes. When it receives this NS message, another neighboring node responds to this NS message by sending an NA message containing the VPI and VSI options with its Prefixes and services via unicast towards the NS-originating node.

Therefore, Prefix and service discovery can be achieved via ND messages (e.g., NS and NA) by vehicular ND with VPI and VSI options. This VND-based discovery may not require an additional Prefix and service discovery scheme, such as DNS-based Service Discovery [RFC6763] (e.g., Multicast DNS (mDNS) [RFC6762] and DNSNA [ID-DNSNA]), other than ND. That is, vehicles and RSUs can rapidly discover the network Prefixes and services of the other party without any additional service discovery protocol.

5. Message Exchange Procedure for V2I Networking

This subsection explains a message exchange procedure for VND in V2I networking, where a vehicle communicates with its corresponding node in the Internet via an RSU.

Figure 5:
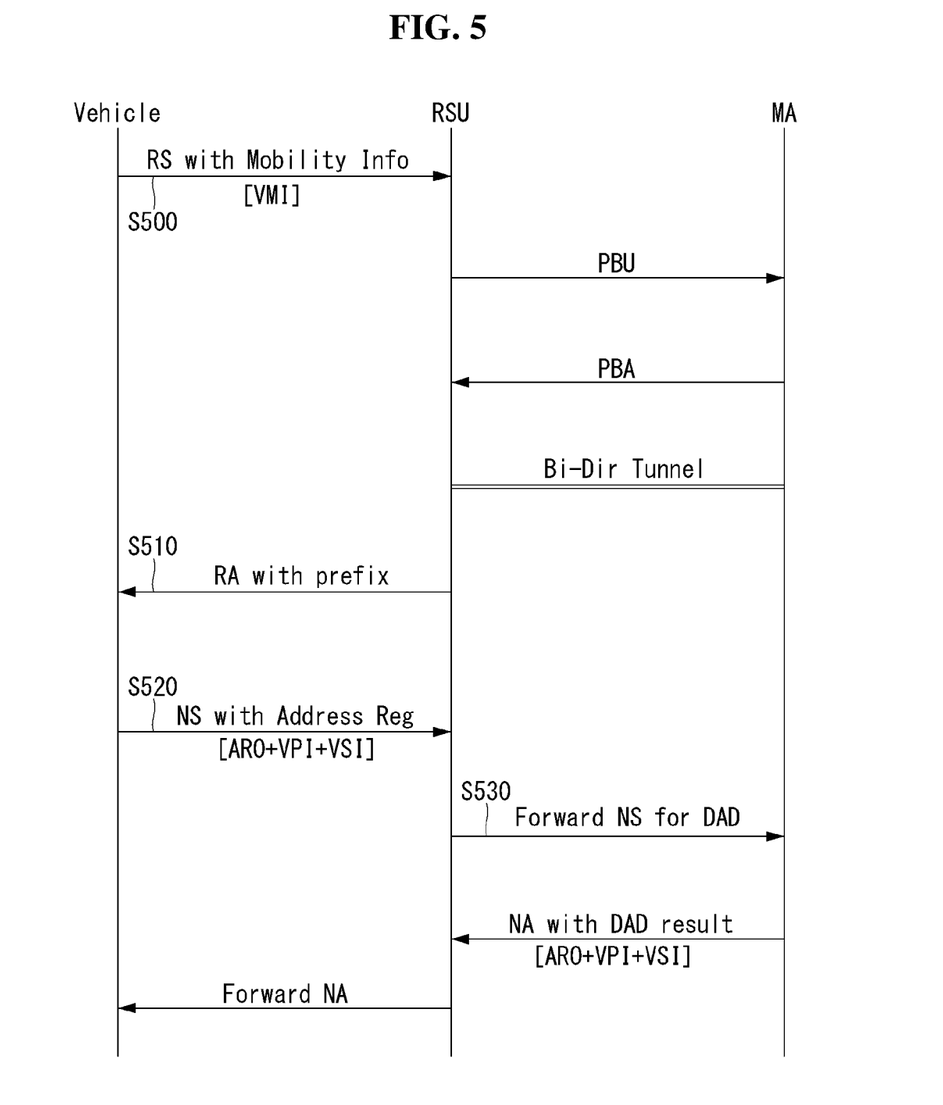
FIG. 5 illustrates a message exchange procedure in V2I networking to which the present disclosure is applicable.

FIG. 5 illustrates an example of message exchange procedure in V2I networking. Detailed steps of the procedure are explained in Section "Address Registration and Duplicate Address Detection". The mobility management part is described in [ID-IPWAVE-VMM].

Figure 7:
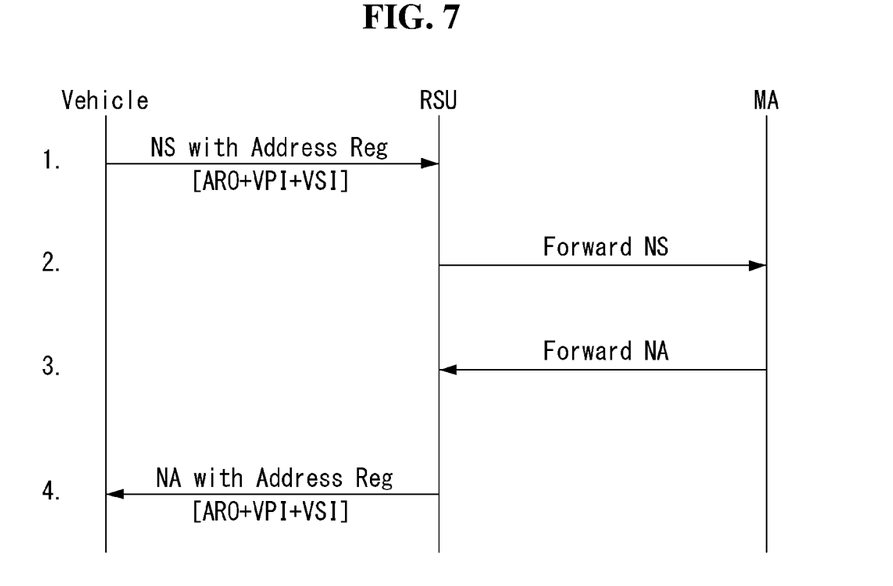
FIG. 7 illustrates a procedure of address registration and multihop DAD to which the present disclosure is applicable.

Note that a vehicle could also perform the Prefix and service discovery simultaneously along with Address Registration procedure, as illustrated in FIG. 7.

The present disclosure specified that RSUs as routers do not transmit periodical and unsolicited multicast RA messages including a Prefix for saving vehicle energy in vehicular networks. Vehicles as hosts periodically initiate an RS message according to a time interval (considering its position and an RSU's coverage). Since they have a local dynamic map (LDM) with the information of RSUs (e.g., position and communication coverage), vehicles can know when they will go out of the communication range of an RSU along with the signal strength (e.g., Received Channel Power Indicator (RCPI) [VIP-WAVE]) from the RSU. RSUs replies with a solicited RA in unicast only when they receive an RS message.

Address Registration and Duplicate Address Detection

This section explains address configuration, consisting of IP Address Autoconfiguration, Address Registration, and multihop DAD via V2I or V2V.

The present disclosure recommends a new Address Registration and DAD scheme in order to avoid multicast flooding and decrease link-scope multicast for energy and wireless channel conservation on a large-scale vehicular network. Host-initiated refresh of RA removes the necessity for routers to use frequent and unsolicited multicast RAs to accommodate hosts. This also enables the same IPv6 address Prefix(es) to be used across a subnet.

There are three scenarios feasible in Address Registration scheme:

1. Vehicle enters the subnet for the first time or the current RSU belongs to another subnet: Vehicles need to perform the Address Registration and multihop DAD as described in the following subsections.

2. Vehicle has already configured its IP addresses with Prefix obtained from the previous RSU, and the current RSU located in the same subnet: This means RSUs have the same Prefix and the vehicle has no need to repeat the Address Registration and multihop DAD.

3. Vehicle is not in the coverage of RSU but has a neighbor registered in RSU: the present disclosure proposes a new multihop V2V scenario for vehicles which are currently not in the communication range of the RSU. If a user vehicle failed to find an on-link RSU, it starts to look for adjacent vehicle neighbors which can work as a relay neighbor to share the Prefix obtained from RSU and undertake DAD of the user vehicle by forwarding DAD messages to RSU.

1. Address Autoconfiguration

A vehicle as an IPv6 host creates its link-local IPv6 address and global IPv6 address as follows [RFC4862]. When they receive RS messages from vehicles, RSUs send back RA messages containing Prefix information (S510). The vehicle makes its global IPv6 addresses by combining the Prefix for its current link and its wireless interface identifier.

The address autoconfiguration does not perform the IPv6 legacy DAD as defined in [RFC4862]. Instead, a new multihop DAD is performed in Section 3.

2. Address Registration

After its IP tentative address autoconfiguration with the known Prefix from an RSU and its link-layer address, a vehicle starts to register its IP address to the serving RSU along with multihop DAD (S520). Address Register Option (ARO) is used in this step and its format is defined in [RFC6775].

ARO is always host-initiated by vehicles. Information such as registration time and registration status contained in ARO are applied to indicate the registration duration and result. ARO will also be forwarded to MA together with NS by RSUs (S530).

Figure 6:
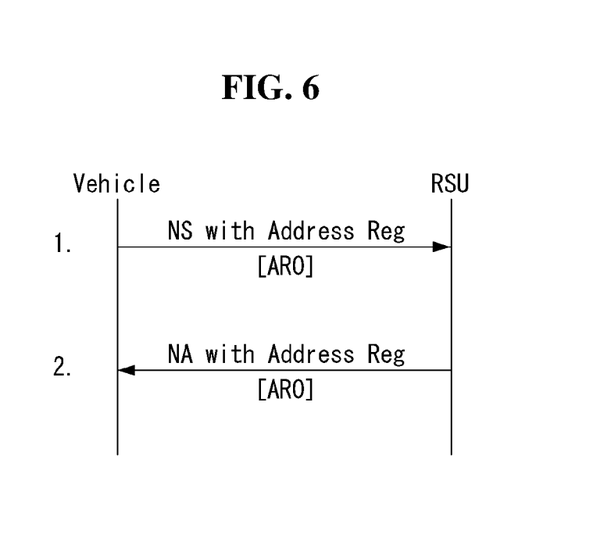
FIG. 6 illustrates a message exchange procedure of address registration to which the present disclosure is applicable.

An example message exchange procedure of Address Registration is presented in FIG. 6. Since Address Registration is performed simultaneously with the multihop DAD, the specific procedure is together described with the DAD mechanism in Section 3.

3. Multihop Duplicate Address Detection

IPv6 node (i.e., router or host) should determine whether or not its IP address is already used in another node, before exchanging IPv6 data packet. In the legacy IPv6 ND, hosts multicast NS messages to all nodes in the same on-link subnet for DAD. Instead of this, an optimized multihop DAD is designed to eliminate multicast messages for energy-saving purpose. For this multihop DAD, Neighbor Cache and DAD Table are maintained by each RSU and an MA, respectively, for the duplicate address inspection during the multihop DAD process. That is, each RSU collects and makes Neighbor Cache Entries (NCE) of all the on-link hosts in its Neighbor Cache. In other words, the MA combines all the NCEs reported by the RSUs and stores it in its DAD Table.

With the multihop DAD, a vehicle can skip the multicast-based DAD in its current wireless link whenever it enters the coverage of another RSU in the same subset, leading to the reduction of traffic overhead in vehicular wireless links.

For the multihop DAD, we take advantage of the procedure of [RFC6775] but simplified the message flows by canceling the two new ICMPv6 message types such as Duplicate Address Request (DAR) and the Duplicate Address Confirmation (DAC). Instead, NS and NA containing ARO are directly forwarded between RSU and MA. This idea is raised because DAR and DAC.

3.1. DAD without Intermediate Vehicle

FIG. 7 illustrates the procedure of Address Registration and multihop DAD. The detailed steps are explained as follows.

1. A vehicle sends an NS message to the RSU in the current communication range in unicast, containing the ARO to register its address.

2. The RSU receives the NS message, and then inspects its Neighbor Cache to check whether or not it is duplicate with IPv6 address of ARO. If there is no duplicate NCE, a tentative NCE is created for this address, and then the RSU forward the NS message containing the ARO to the MA for the multihop DAD.

3. When the MA receives the NS from an RSU, it checks whether the register-requested IPv6 address exists in its DAD Table or not. If an entry with the same address exists in the DAD Table, which means that the address is considered "Duplicate Address", then MA returns a NA message containing the registration status in ARO to notify the RSU of the address duplication. If no entry with the same address exists in the DAD Table, which means that an entry for the address is created, then MA replies a NA message to the RSU to confirm the uniqueness of the register-requested address to the RSU.

4. If the address duplication is notified by the MA, the RSU deletes the tentative NCE, and forward NA with to the address-registration vehicle to notify the registration failure. Otherwise, the RSU changes the tentative NCE into a registered NCE in its Neighbor Cache, and then forward NA to the vehicle to notify the registration success.

Thus, the multihop DAD is processed simultaneously with the Address Registration. Note that the tentative address is not considered assigned to the vehicle until the MA confirms the uniqueness of the register-requested address in the multihop DAD.

3.2. DAD with One Intermediate Vehicle

If a vehicle failed to register a default router, it triggers multihop neighbor discovery to look for vehicle neighbors which can provide relay service using multi-hop communication. In the present disclosure, only if Router Discovery (RD) fails, the vehicle assumes that V2V communication is not directly associated with the RSU and triggers multihop V2V through a relay scenario.

Since a local dynamic map (LDM) with the information of RSU has position and communication coverage of RSU, vehicles can determine if they are available to serve as a relay vehicle. Only vehicles with the ability to serve as temporary relays will take action when they receive relay service requests. The user vehicle can process global address configuration, Address Registration, and DAD through its relay vehicle before it enters the coverage of RSUs.

Figure 8:
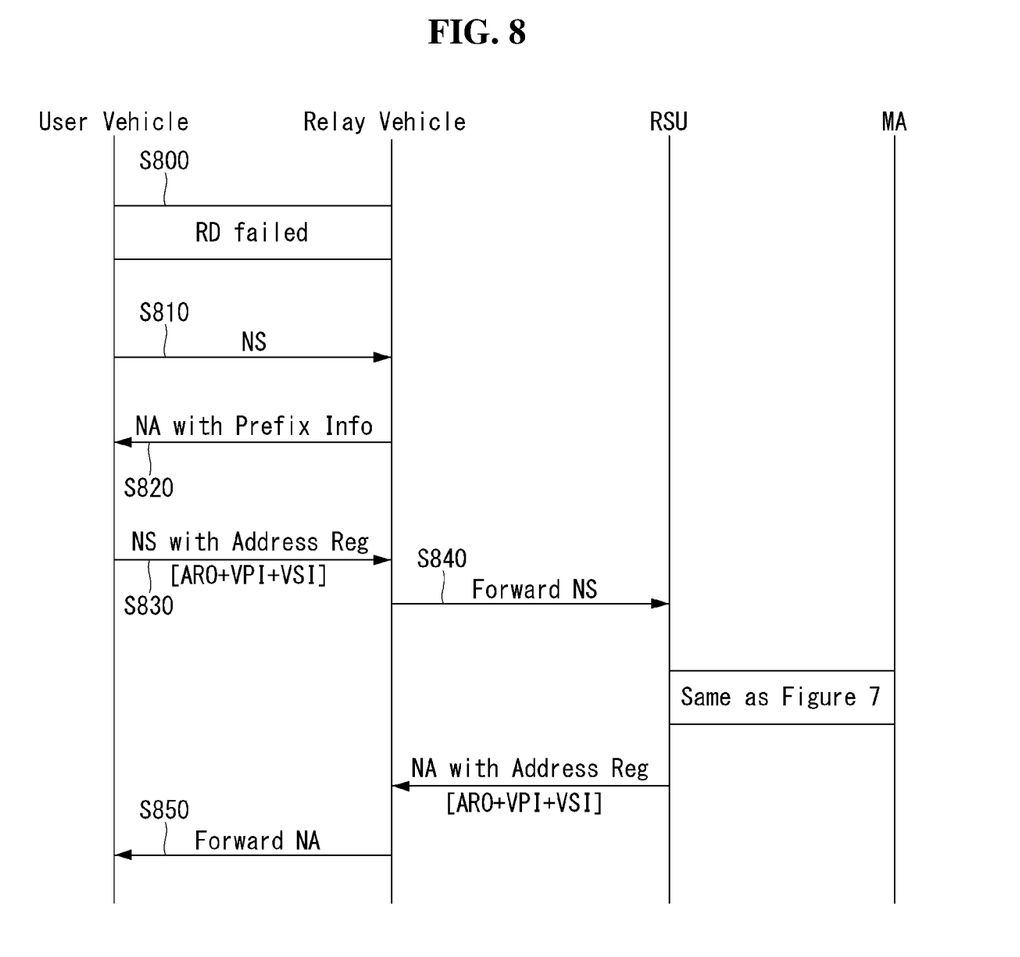
FIG. 8 illustrates address registration and multihop DAD, via V2V relay, to which the present disclosure is applicable.

FIG. 8 illustrates address registration and multihop DAD, via V2V relay, to which the present disclosure is applicable.

Referring to FIG. 8, when a user vehicle failed to directly register to an RSU in a wireless communication range (S800), it initiates neighbor discovery to detect vehicle neighbors through V2V communication. Vehicle sends NS messages to connect with neighbors in range (S810). If neighbor can provide relay service, it creates an NCE for user vehicle, setting its own address as relay address, and sends back NA with Prefix information received from RSU (S820).

To guarantee vehicles could find the nearest neighbor from multiple neighbors which can act as relay vehicles, a new time-out based routing mechanism may be presented to select the nearest neighbor by hop distance parameter carried in Prefix Information Option. That is, a user vehicle multicasts (S810) NS messages to look for relay vehicles after RD failed (S800) and waits for 1.5 seconds to receive all NA replies from neighbors. Each NA carries its own global Prefix(es) and the hop distance(s) in Prefix Information Option (S820). The user vehicle preserves every NA reply in a temporary router list and selects the one with least hop counts as its relay vehicle after time out.

With receipt of NA, the user vehicle configures its global address with Prefix information. After this, the user vehicle takes up to initiate the Address Registration along with the DAD process via relay vehicle (S830). NS message indicates the relay vehicle's address as next-hop to reach the RSU. In such a case, when relay vehicle receives the relay request message, it will forward NS message to RSU (S840). The procedure sets up on the rails except MA will include the relay vehicle's address as relay address in NCE to indicate that at this moment, it is not a directly attached vehicle, and sets the relay address as the next-hop address. Relay vehicle forwards DAD result information message to user vehicle as soon as it received (S850).

3.3. DAD with Multiple Intermediate Vehicles

The present disclosure supports multihop communications (e.g., multihop DAD and UDP/TCP transmission) for remote vehicles through multiple relay vehicles. Vehicles which have already finished DAD process can serve as a mobile router as a relay vehicle or a packet forwarder.

A routing mechanism may be used to accomplish route selections among user vehicles and serving RSUs when multiple vehicles act as relay vehicles. Taking advantage of the Destination-Sequenced Distance-Vector routing protocol (DSDV) [DSDV], this new routing approach supposes that each vehicle holds a Neighbor Routing Table which integrates the neighbor information in Neighbor Cache and forwarder information for remote vehicles. Each vehicle which acts as a relay vehicle for this remote vehicle will make records in its Neighbor Routing Table.

Figure 9:
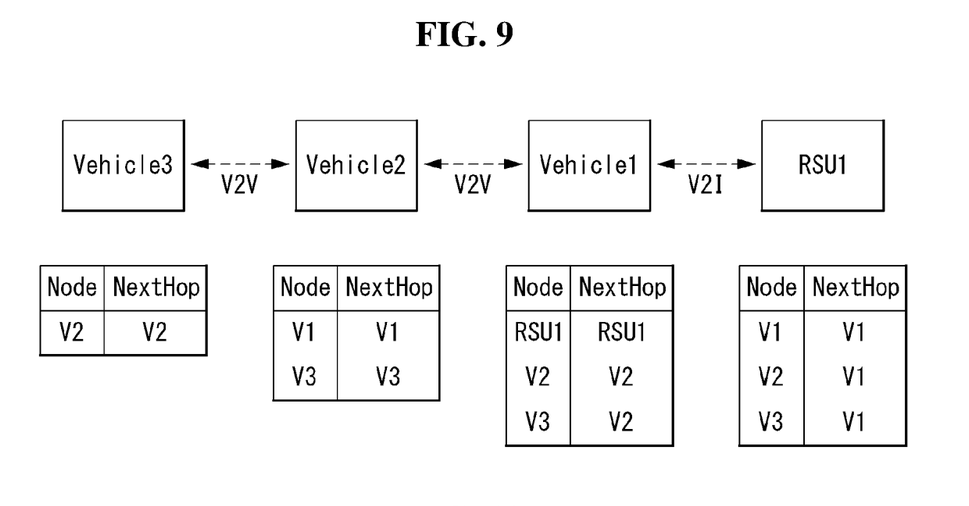
FIG. 9 illustrates parameters of a neighbor routing table when two or more vehicles to which the present disclosure is applicable work as intermediate relay vehicles.

FIG. 9 illustrates an example of parameters in Neighbor Routing Table when more than one vehicle works as intermediate relay vehicles.

In FIG. 9, Vehicle3 is indirectly connected to RSU1 via Vehicle2 and Vehicle1. When the Vehicle1 and the Vehicle2 forward messages for the Vehicle3, they make records in its Neighbor Routing Table including the next-hop node to indicate the route to the Vehicle3. This can ensure that the packets from a source vehicle can be successfully transmitted to an RSU as well as the reverse packet path existing from the RSU to the source vehicle.

Figure 10:
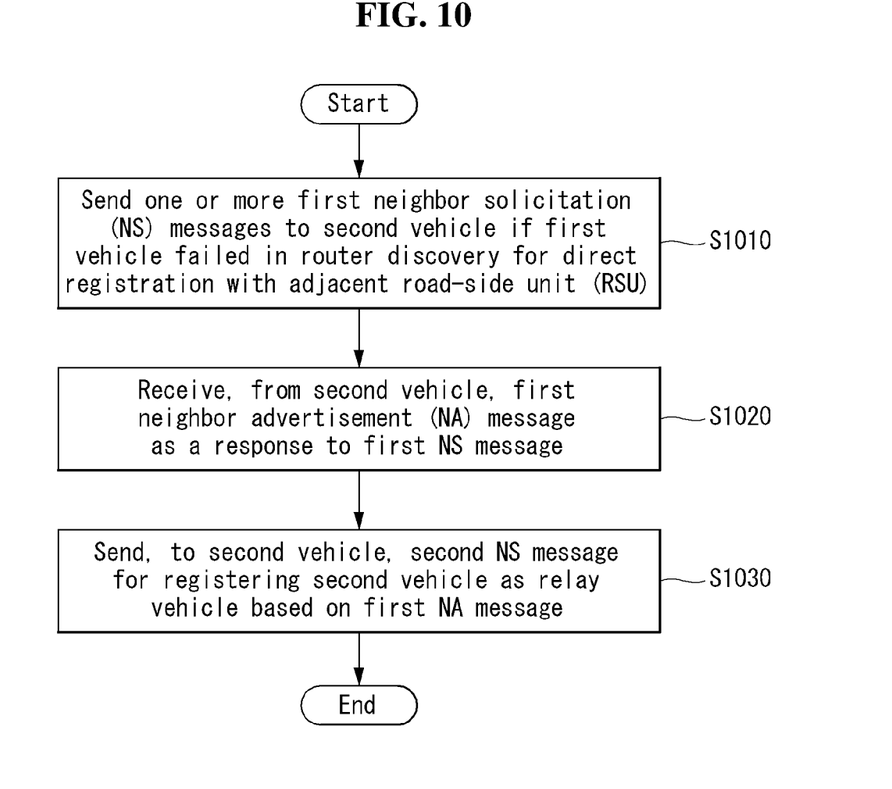
FIG. 10 illustrates an implementation to which the present disclosure is applicable.

FIG. 10 illustrates an implementation to which the present disclosure is applicable.

Referring to FIG. 10, a first vehicle may operate to perform a registration with a RSU using a second vehicle as a relay node.

If the first vehicle failed in a router discovery for a direct registration with an adjacent road-side unit (RSU), the first vehicle sends one or more first neighbor solicitation (NS) messages to the second vehicle in S1010.

The first vehicle receives, from the second vehicle, a first neighbor advertisement (NA) message as a response to the first NS message in S1020.

The first vehicle sends, to the second vehicle, a second NS message for registering the second vehicle as a relay vehicle based on the first NA message in S1030.

The first vehicle may receive, from the RSU, a second NA message as a response to the second NS message through the second vehicle. More specifically, the second NA message may be generated based on a first table for managing a duplicate address included in a mobility anchor managing the mobility of the IP-based vehicular networks. For example, the first table may include a DAD table.

The first vehicle may wait for a predetermined time to receive the first NA message and select the second vehicle based on the first NA message. For example, the one or more first NS messages may be multicasted to surrounding vehicles. More specifically, the first vehicle may select a vehicle with the smallest number of hops as the second vehicle based on the number of hops included in the first NA message.

When the relay vehicle includes a plurality of relay vehicles, the first vehicle and the relay vehicle may have a second table for information on a relay path up to the RSU. For example, the second table may include a neighbor routing table.

Overview of Device to which the Present Disclosure is Applicable

Figure 11:
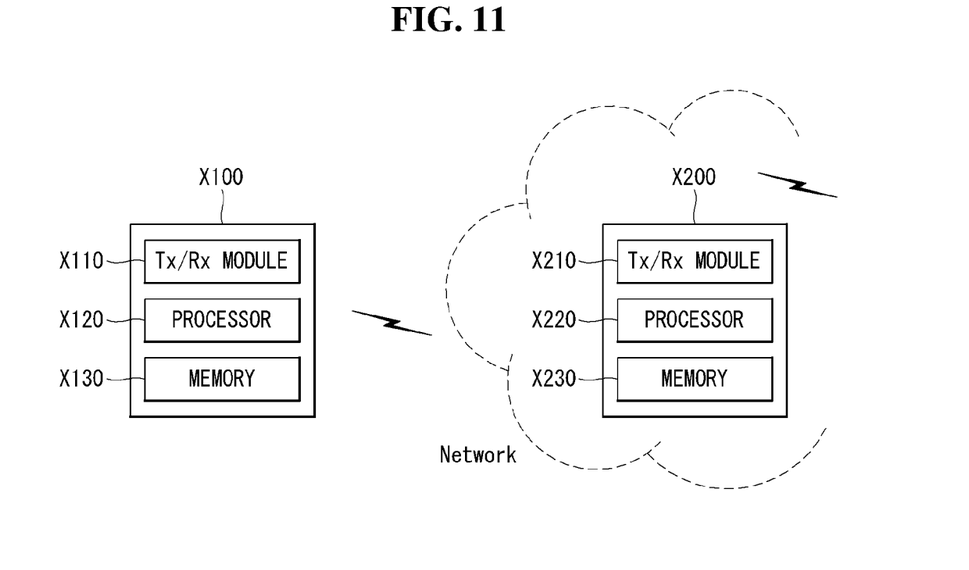
FIG. 11 illustrates an overview of a device to which the present disclosure is applicable.

Referring to FIG. 11, a server X200 according to an embodiment may be a Multi-Access Edge Computing (MEC) server or a cloud server and may include a communication module X210, a processor X220, and a memory X230. The communication module X210 may also be referred to as a radio frequency (RF) unit. The communication module X210 may be configured to transmit various signals, data, and information to an external device and allow the external device to receive various signals, data, and information. The server X200 may be connected wiredly and/or wirelessly to the external device. The communication module X210 may be divided and implemented into a transmitter and a receiver. The processor X220 may be configured to control overall operation of the server X200 and perform functions of computing and processing information, etc. that the server X200 will transmit and receive with the external device. The processor X220 may also be configured to perform a server operation proposed in the present disclosure. The processor X220 may control the communication module X210 so that it transmits data or messages to a user equipment (UE), other vehicles, or other servers according to a proposal of the present disclosure. The memory X230 may store the computed and processed information, etc. for a predetermined time and may be replaced by the component such as a buffer.

Detailed configuration of the UE X100 and the server X200 can be implemented to individually apply the contents described in various embodiments of the present disclosure, or simultaneously apply two or more embodiments, and the description of overlapping contents is mitted for clarity.

The embodiments described above are predetermined combinations of the components and the features of the present disclosure. Each component or feature, unless specifically stated, should be considered as being selective. Each component or feature may be implemented in a type in which they are not combined with other components or features. Further, embodiments of the present disclosure may be configured by combining some components and/or features. The order of the actions described in embodiments of the present disclosure may be changed. Some components or features of any embodiment may be included in another embodiment and may be replaced with corresponding configurations and features of another embodiment. Unless specifically referred in claims, it is apparent that an embodiment may be configured by combining claims or new claims may be included through amendment after application.

Embodiments of the present disclosure may be implemented by various measures, such as hardware, firmware, software, or combinations thereof. When hardware is used, an embodiment of the present disclosure may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a processor, a controller, a micro controller, and a micro processor.

In the case of an implementation by firmware or software, the embodiments described in the present disclosure may be implemented in the form of a module, a procedure, or a function for performing the capabilities or actions described above. The software code may be stored in a memory and driven by the processor. The memory may be located inside or outside the processor, and may exchange data with the processor by various well-known means.

It is apparent to those skilled in the art that the present disclosure can be embodied in other specific types within a range not departing from the necessary characteristics of the present disclosure. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

The present disclosure can be applied to various vehicular network systems.

What is claimed is:

1. A method for a first vehicle to perform a neighbor discovery in an IP-based vehicular network, the method comprising:
   based on the first vehicle failed in a router discovery for a direct registration with an adjacent road-side unit (RSU), sending one or more first neighbor solicitation (NS) messages to a second vehicle;
   receiving, from the second vehicle, a first neighbor advertisement (NA) message as a response to the first NS message; and
   sending, to the second vehicle, a second NS message for registering the second vehicle as a relay vehicle based on the first NA message.

2. The method of claim 1, further comprising receiving, from the RSU, a second NA message as a response to the second NS message through the second vehicle.

3. The method of claim 2, wherein the second NA message is generated based on a first table for managing a duplicate address included in a mobility anchor (MA) managing a mobility of the IP-based vehicular network.

4. The method of claim 3, further comprising:
   waiting for a predetermined time to receive the first NA message; and
   selecting the second vehicle based on the first NA message,
   wherein the one or more first NS messages are multicasted to surrounding vehicles.

5. The method of claim 3, wherein based on the relay vehicle including multiple relay vehicles, the first vehicle and the relay vehicle have a second table for information on a relay path up to the RSU.

6. A first vehicle performing a neighbor discovery in an IP-based vehicular network, the first vehicle comprising:
   a transceiver configured to transmit and receive a signal;
   a memory configured to store data; and
   a processor configured to control the transceiver and the memory,
   wherein the processor is configured to:
   based on the first vehicle failed in a router discovery for a direct registration with an adjacent road-side unit (RSU) through the transceiver, send one or more first neighbor solicitation (NS) messages to a second vehicle;
   receive, from the second vehicle, a first neighbor advertisement (NA) message as a response to the first NS message; and
   send, to the second vehicle, a second NS message for registering the second vehicle as a relay vehicle based on the first NA message.

7. The vehicle of claim 6, wherein the processor is configured to receive, from the RSU, a second NA message as a response to the second NS message through the second vehicle.

8. The vehicle of claim 7, wherein the second NA message is generated based on a first table for managing a duplicate address included in a mobility anchor (MA) managing a mobility of the IP-based vehicular network.

9. The vehicle of claim 8, wherein the processor is configured to wait for a predetermined time to receive the first NA message and select the second vehicle based on the first NA message,
   wherein the one or more first NS messages are multicasted to surrounding vehicles.

10. The vehicle of claim 8, wherein based on the relay vehicle including multiple relay vehicles, the first vehicle and the relay vehicle have a second table for information on a relay path up to the RSU.

* * * * *